United States Patent [19]

Annis

[11] Patent Number: 5,528,656
[45] Date of Patent: Jun. 18, 1996

[54] METHOD AND APPARATUS FOR SAMPLING AN OBJECT

[76] Inventor: Martin Annis, 65 Banks St., Cambridge, Mass. 02138

[21] Appl. No.: 308,554

[22] Filed: Sep. 19, 1994

[51] Int. Cl.$^6$ .................................................. H05G 1/64
[52] U.S. Cl. .............................................. 378/98.2; 378/62
[58] Field of Search ............................ 378/62, 98, 98.2, 378/98.7, 98.8

[56] References Cited

U.S. PATENT DOCUMENTS

4,644,398  2/1987  Shimoni .......................... 378/98.2 X
4,891,844  1/1990  Kiri .................................... 378/62
5,164,583  11/1992  Aichinger et al. .................. 378/98.7

Primary Examiner—David P. Porta
Attorney, Agent, or Firm—Cesari and McKenna

[57] ABSTRACT

An improved digital image sampling arrangement samples only one pixel of a predetermined region of pixels and assigns a density value to that pixel. The remaining, unsampled pixels of the region are then allocated density values based on the value of the sampled pixel using either a simple algorithm or an extrapolation algorithm. This improved arrangement provides more precise information about the sampled image than a prior art technique of merely enlarging each pixel by a predetermined factor.

16 Claims, 9 Drawing Sheets

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 4 | 8 | 8 | 3 | 0 | 0 | 0 | 0 |
| 0 | 0 | 0 | 5 | 9 | 9 | 9 | 9 | 9 | 9 | 7 | 1 | 0 |
| 0 | 1 | 6 | 9 | 9 | 9 | 9 | 9 | 9 | 9 | 8 | 0 |
| 0 | 7 | 9 | 9 | 9 | 9 | 9 | 9 | 9 | 9 | 8 | 0 |
| 0 | 6 | 9 | 9 | 9 | 9 | 9 | 9 | 9 | 9 | 2 | 0 |
| 0 | 0 | 2 | 7 | 8 | 9 | 9 | 9 | 9 | 5 | 0 | 0 |
| 0 | 0 | 0 | 0 | 0 | 0 | 0 | 0 | 0 | 0 | 0 | 0 |

METHOD AND APPARATUS FOR SAMPLING AN OBJECT

FIELD OF THE INVENTION

This invention relates generally to digital sampling techniques and, more specifically, to an improved method and apparatus for efficiently sampling an object to acquire greater information about that object.

BACKGROUND OF THE INVENTION

A typical black and white image contains both spacial and density information. The image may be digitized for display on a computer screen by sampling every pixel in the image to achieve a digital value of the density in that pixel. Alternatively, the image may be generated by, for example, exposing an object to an X-ray beam transmitted from an X-ray source and measuring the resulting transmitted beam using a detector array disposed behind the object. A method of arranging the X-ray source and detector is to form a narrow pencil beam of X-rays at the output of the X-ray source. This pencil beam is then moved vertically along a line, from top to bottom, exposing a single narrow detector to the X-rays transmitted through the object. The location of the pencil beam then determines the position of the image pixel along the vertical line.

Typically, the object to be imaged is moved through the X-ray beam and detector so that all of the spacial locations of the object are exposed to the beam. At each location, the output electrical signal of the detector is sampled using a sampling circuit and a signal is generated for display on the computer screen. For this single-detector system, the spacial resolution is limited by the number of samples taken during each vertical pass of the pencil beam and the displacement of the object between samples.

At each spacial location, a number is typically assigned to the amount of energy observed by the detector at that location. The resulting number of this process, called quantization, is proportional to the electrical signal at the output of the detector. The quantization process generally involves analog-to-digital conversion, where the input energy to the detector is represented by a finite number of density values. However, if the energy at a particular pixel location does not equal one of the finite density values, it is assigned the value of a closest finite value. For example, if the finite density values range from 1.0 to 10.0 and the density value at a pixel was observed by the detector to be 4.3, the quantizer would assign that pixel the density value 4.0 (the closest one). The resulting error in assignment of such a value is known as a quantization error.

Figure 1A:
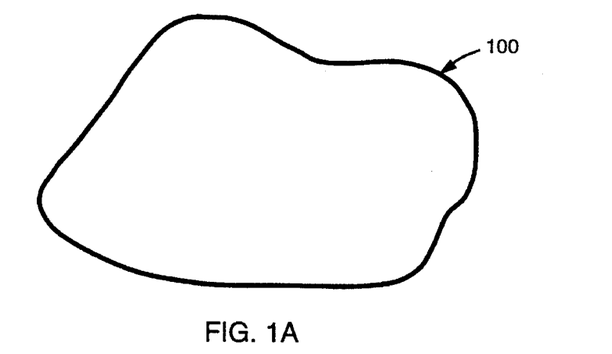
FIGS. 1A–C depict a prior art digital image formation technique.
Figure 1B:
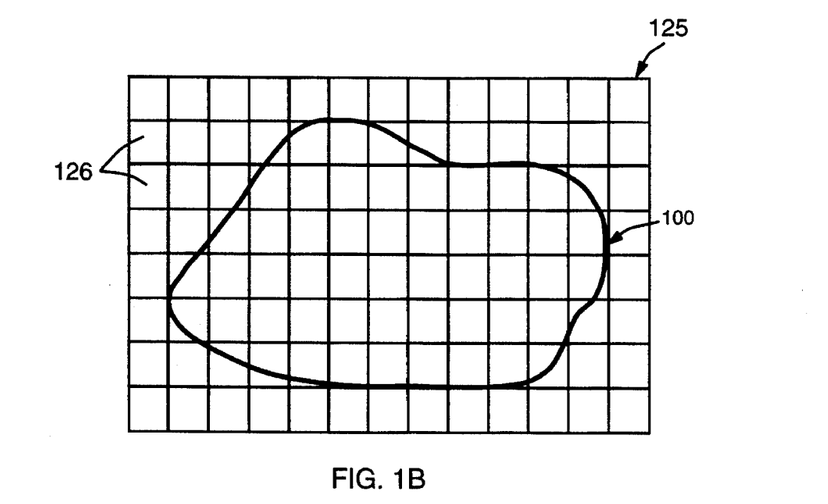
Figure 1C:
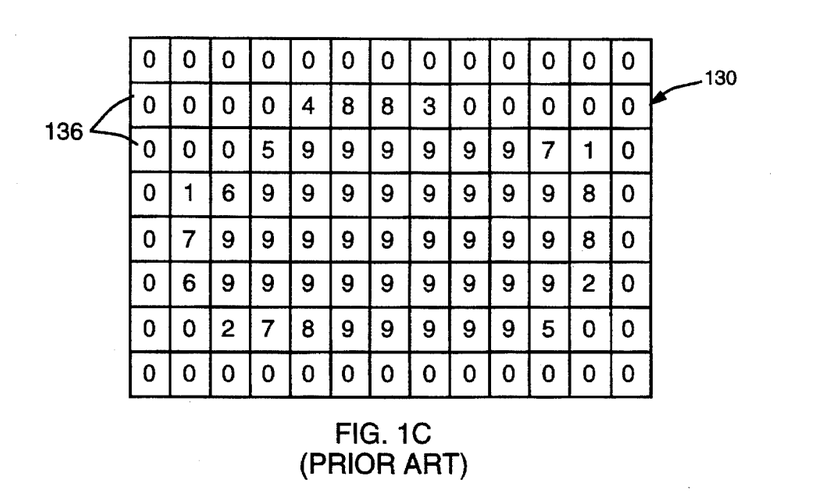

FIGS. 1A–C shows a prior art technique for conventional digital image formation. FIG. 1A depicts an object 100 to be imaged. The spacial sampling process may be considered as overlaying a grid 125 on the object 100, as shown in FIG. 1B, with the detector (not shown) examining the energy output from each grid box 126 and converting it to an electrical signal. The quantization process then assigns a density number to the electrical signal. The result, which is shown in FIG. 1C as a matrix 130 of numbers, is the digital representation of the image. Each spacial location 136 in the image (or grid) to which a number is assigned is a pixel and the size of the sampling grid is typically determined by the number of pixels on each side of the grid, e.g., 1000×1000. After the digital image is obtained, a digital-to-analog converter (not shown) may be used to convert the matrix of pixels back to an image that can be viewed on the computer display.

The quality of representation of a digital image is typically determined by the number of pixels and by the number of levels used in the quantization, i.e., how coarse or fine is the quantization, while the number of pixels needed to form the digital image increases as the spacial resolution improves. To achieve a quality digital image, it is thus apparent that a large amount of information is typically needed to represent the image. There are several reasons why the acquisition of an image with many pixel samples may be difficult (or even impossible). For example, the X-ray source used in the illustrative embodiment of the invention herein is a high energy pulsed linear accelerator that is limited in its pulse repetition rate. To acquire the typical image described above, the X-ray source must be pulsed approximately one million times which, practically, would consume an unreasonably long period of time.

In addition, transmitting such image information over a communication channel, such as a telephone line, from computer to computer may be expensive. For example, a 1000×1000 image having 16 bits/pixel (including grey level representation) requires 2 megabytes (MB) of information to describe the image. At data rates of at least 2400 bits/second, it would require about 1.8 hours to transmit this information, which is time consuming and costly.

One way to minimize the amount of information needed to represent an image is to reduce the number of pixels used to display the image. Thus, instead of recording data for 1,000,000 pixels, i.e., the 1000×1000 image, a system may be configured to record data for only 100,000 pixels. This technique reduces the number of pixels by effectively making each pixel 10 times larger in area; however, it also produces a blurred image.

Therefore, it is an object of the present invention to minimize the number of sampled pixels needed to represent an object as a non-blurred image.

SUMMARY OF THE INVENTION

Broadly stated, the invention relates to an improved digital image sampling arrangement that samples only one pixel of a predetermined region of pixels and assigns a density value to that pixel. The remaining, unsampled pixels of the region are then allocated density values based on the assigned value of the sampled pixel using either a simple algorithm or an extrapolation algorithm. For example, the remaining unsampled pixels of a region may be designated the same value as the sampled pixel (i.e., the simple algorithm approach) or they may be designated a value equal to the average of sampled pixels for two adjacent regions (i.e., extrapolation algorithm). Advantageously, the arrangement described herein provides more information about the sampled image than the prior art technique of merely enlarging each pixel by a predetermined factor.

Specifically, the improved sampling arrangement provides additional precise data stored in the outer pixels of a region and relating to fine points of the image portion contained in the sampled pixel of that region. That is, although both the improved arrangement and the prior art pixel enlarging technique may operate in connection with the same number of pixels, the improved sampling arrangement provides detailed information about the outer pixels encompassing the sampled pixels. In accordance with the teachings herein, this detailed information relates to edges of the sampled image.

In one aspect of the invention, the improved sampling arrangement may be employed to acquire data using, for example, a pulsed X-ray source. Here, every fourth or ninth pixel is sampled to obtain a density value for that sampled pixel within a particular region. The sampled value is then used to assign density values to the remaining pixels of the region. This arrangement is sufficient to reconstruct a complete image primarily because the complete image has sharp edges and, despite slight distortions, the image will appear to have higher contrast than an image with blurred edges. In another aspect of the invention, the improved arrangement may be used to send an image over a communication channel using only a fraction of the pixels that define the image.

An advantage of the improved digital sampling arrangement is a reduction in the number of pixels needed to provide a complete quality image.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 2:
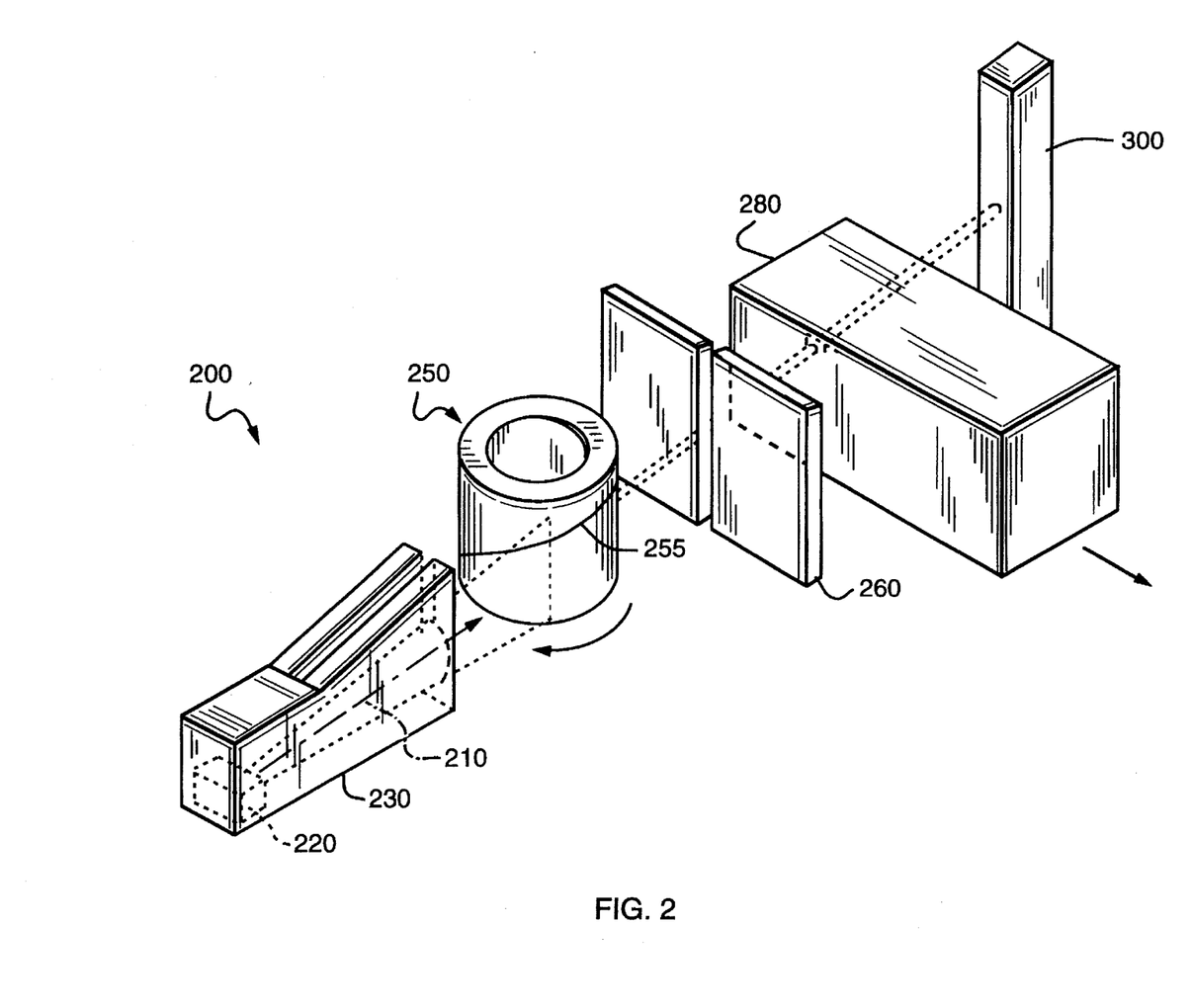
FIG. 2 depicts an X-ray inspection system that may be advantageously used with the improved digital image sampling arrangement in accordance with the invention.

FIG. 2 depicts an X-ray inspection system 200 that may be used in connection with the improved digital image sampling arrangement described herein. The elements of the system are not drawn to scale for purposes of ease of depiction and ease of description, although the figures depict their relationship relative to one another. The X-ray inspection system 200 comprises an X-ray source 220 for generating X ray pulses that radiate as a cone. The source is preferably contained within an enclosure 230 having an integrally-formed precollimator that limits the radiated cone along its center axis 210 to form a "fan-beam" of X rays. A rotating cylindrical collimator 250 having a helical slit 255 converts the fan-beam into a pencil-beam of X rays, which may be further limited by a fixed-slit collimator 260. The X-ray beam penetrates the entire area of an object 280 and is intercepted by a detector 300, which transforms the X rays into image data for presentation on a computer display screen (not shown).

Figure 3:
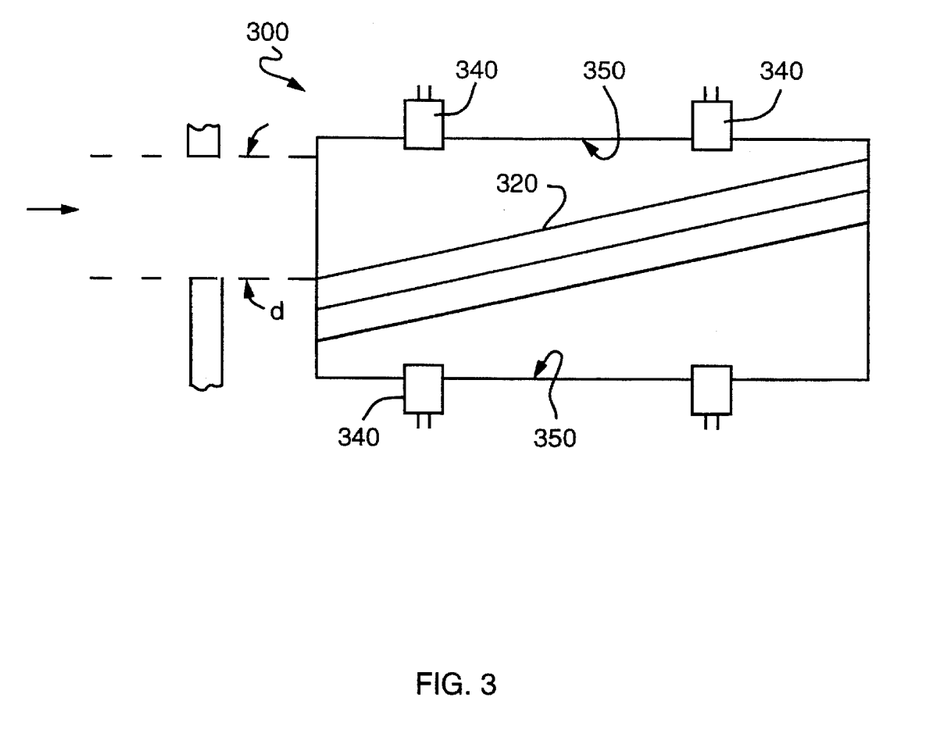
FIG. 3 is a plan view of a detector, including scintillating screens and photomultiplier tubes, for use in the X-ray inspection system of Fig.

Referring to FIG. 3, the detector 300 preferably comprises at least one scintillating screen 320 optically coupled to a plurality of photomultiplier tubes 340 disposed along an inner reflecting surface 350 of the detector; however, other photoemissive detecting elements, such as photodiodes, may be used within the teachings of the invention.

The scintillating screen 320 is similar to a conventional screen used in medical applications with film, and is commonly referred to as an "intensifying screen". The X-ray path in the scintillating screen is generally long and may be created by slanting the screen at a small angle with respect to the beam. Preferably, scintillating screens 320 are arranged in a back-to-back configuration to increase the efficiency of the detector 300. When the pencil-beam X rays strike the scintillating screen, visible light is produced and detected by the photomultiplier tubes 340 which, in turn, generate signals used to form the X-ray image.

The photomultiplier tube 340 is a photocell comprising a vacuum tube and a photosensitive screen for measuring light. The vacuum tube typically contains a photoemissive element, e.g., a photocathode, and a string of dynode stages used to amplify current by electron multiplication. Current is produced when visible light enters the tube and is absorbed by the photoemissive element.

Figure 4:
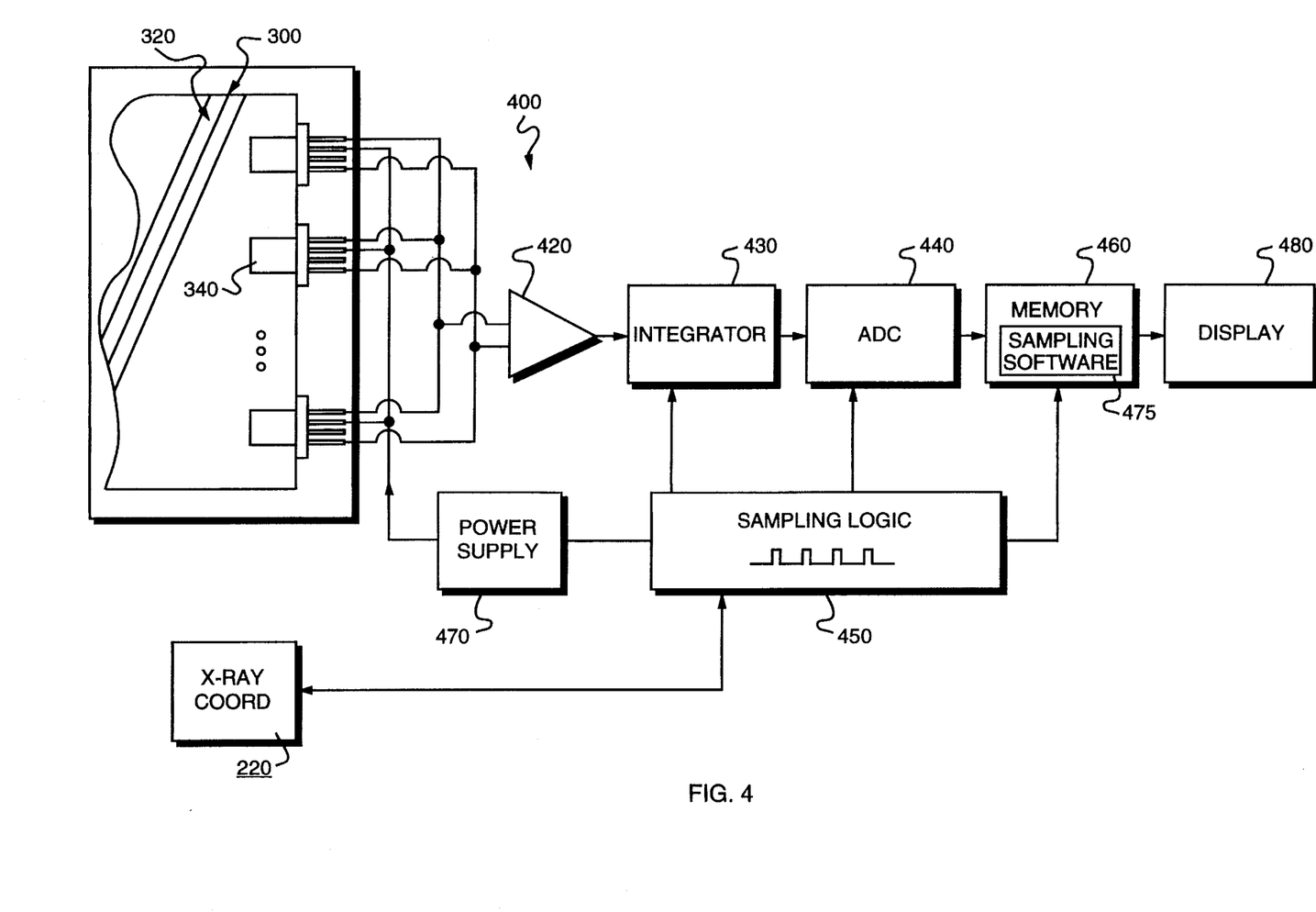
FIG. 4 is a block schematic diagram of an electronic circuit used to control the detector of FIG. 3.

FIG. 4 is a block schematic diagram of an electronic circuit 400 used to control the detector 300. The photomultiplier tubes 340 are preferably arranged in parallel and supply a net analog signal to an amplifier circuit 420, whose output is provided to an analog-to-digital converter (ADC) 440 via an integrator circuit 430. Sampling logic 450 controls sampling of the outputs of the photomultiplier tubes 340 by the integrator 430 and ADC 440 at a predetermined rate, preferably as determined by the X-ray source 220. The resulting digitized signal is provided to a memory 460 for subsequent display on a device, such as a computer display screen 480, as pixels of an image. The memory 460 typically comprises random access memory (RAM) devices for temporary storage of information, including a sampling software application program 475 as described herein.

The area of a single display pixel is preferably equal to the cross-section area of the pencil beam and the X-ray source 220 preferably emits one pulse, containing many X-ray photons, per pixel for display on the screen 480; however, this ratio may be altered. The actual number of X-ray photons per pixel that enter the object may be as many as $10^5$; that is, there may be $10^5$ X-ray photons per pixel. The number of photons per pixel that enter the detector 300 after attenuation by the object may be as small as one or two X ray photons per pixel, which the photomultipliers are sufficiently sensitive to detect.

Referring to FIGS. 2–4, each time a pulse of X-rays in the pencil beam strikes the object, the information is assigned to the relevant pixel by the sampling software program 475 operating with, inter alia, the detector 300 and its control circuit 400, as is well-known. Operationally, the pulsed pencil beam strikes the object at a particular location and then shuts-off. The next time the pulsed beam appears, it is displaced to another location on the object. Since the beam did not impinge upon the intervening pixels, no sampling occurs between these locations and all of the data acquired from the two distant locations are assigned to the two impinged pixels.

Figure 5:
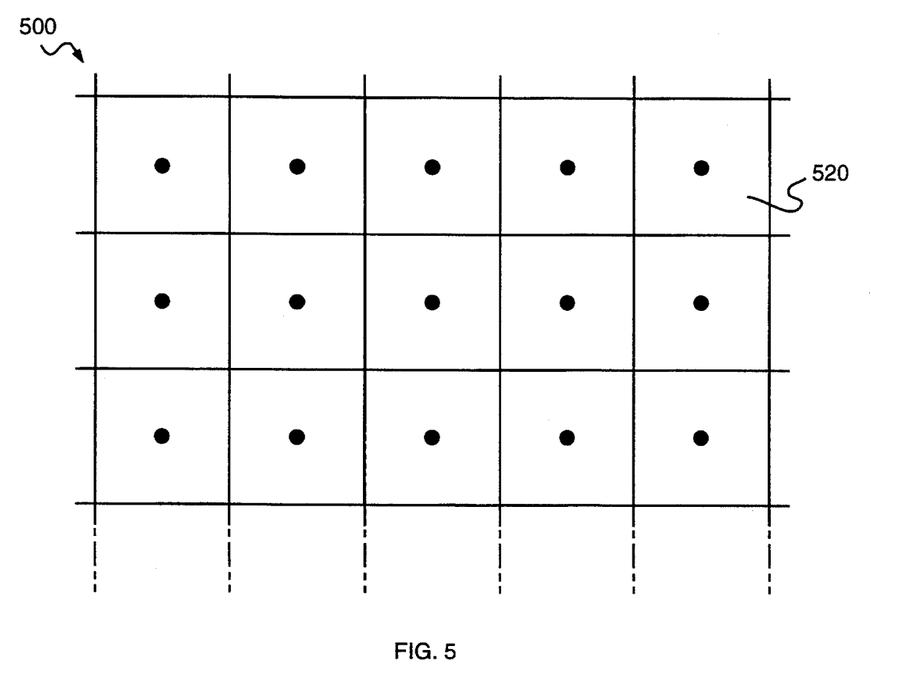
FIG. 5 shows an array of pixels for displaying an image which is sampled using a prior art technique of enlarging the size of pixels.

It is apparent that the data collection rate of the system 200 is limited by the repetition pulse rate of X-ray source 220, which is typically too slow to collect an image in a usefully short time interval. One way to compensate for such limited data collection capability is to minimize the amount of information needed to represent an image; previously, this has been achieved by reducing the number of pixels used to display the image. FIG. 5 shows an array 500 of pixels for displaying an image on the computer screen 480 using a prior art technique of enlarging the typical size of each pixel 520 used to image an object. Here, a black dot denotes each pixel 520 that is sampled, which is every pixel of the array 500. However, as previously noted, this prior art technique produces a blurred image.

Figure 6:
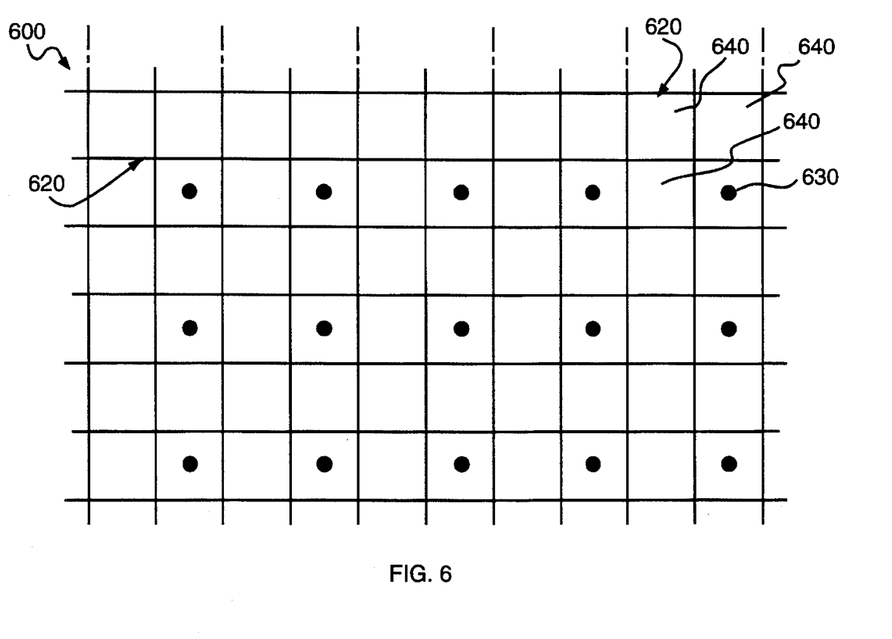
FIG. 6 shows an array of pixels for displaying an image which is sampled in accordance with the improved digital image sampling arrangement of the present invention.

A digital image may also be generated with minimal information by employing a larger number of smaller pixels and sampling only a subset of those smaller pixels, as indicated by the black dots in FIG. 6. The subset of sampled pixels, which preferably equals the number of large pixels used in the prior art technique of FIG. 5, encompasses only portions of the entire image; thus, an arrangement is needed to determine the values of the remaining pixels. In accordance with the invention, an improved method and apparatus is provided for sampling the subset of pixels and determining the values allocated to the remaining pixels.

FIG. 6 shows a portion of a pixel field 600 for displaying an image on the screen 480. In the illustrative embodiment, the field 600 is divided into a plurality of regions 620 each preferably the size of a pixel 520 of FIG. 5, yet containing, e.g., four (4) smaller pixels. It is to be understood that the image could also be divided into regions having various other numbers of pixels, e.g., nine (9) pixels. In either case, only one pixel is sampled.

In accordance with the principles of the invention, the density value measured in the sampled pixel 630 is used as a basis for allocating values to the remaining, unsampled pixels 640 of the region using either a simple algorithm or an extrapolation algorithm, as described further herein. Thus, only one-fourth of the region 620 of pixels are sampled. The values assigned to the remaining unsampled pixels typically result in a more precise definition of the edges of objects.

Specifically, after sampling the selected pixel 630 and assigning a density value to it, each of the three (surrounding) unsampled pixels 640 may be designated the same density value as the sampled pixel in accordance with a simple algorithm approach; alternately, each of those remaining pixels may be designated a value equal to the average of two adjacent sampled pixels in accordance with an extrapolation algorithm. This latter algorithm may be used in an embodiment of the invention to optimize the resulting image.

At first glance, this would appear to achieve no improvement in the image compared to a procedure whereby the sampled pixels are 4 times larger. However, this is not the case because for every region of 4 pixels at least the sampled pixel has exactly the correct value. Moreover, use of the improved sampling arrangement enables the image to be formed 4 times faster than it would be formed if every pixel were sampled. This sampling arrangement is sufficient to reconstruct a complete image primarily because that image has sharp edges and, despite slight distortions, it also appears to have higher contrast than an image with blurred edges.

Figure 7:
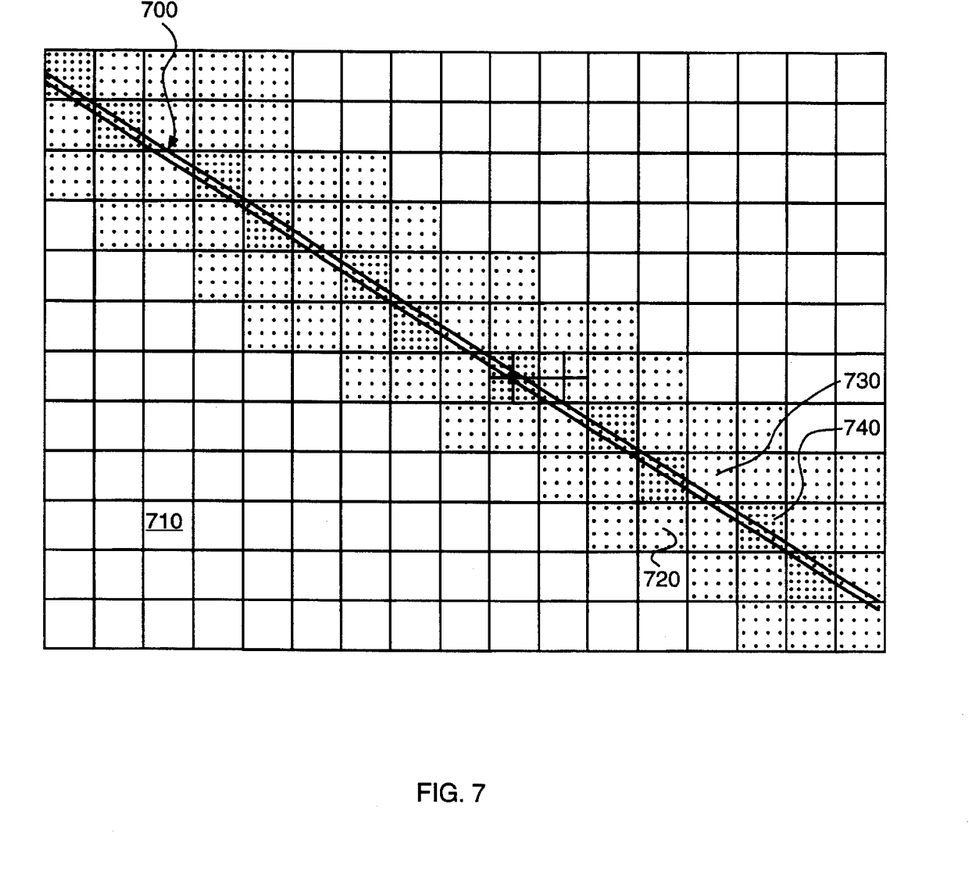
FIGS. 7 shows an image of a thin wire disposed over of a low density plate material, the image having been sampled using the prior art sampling technique of FIG. 5.

FIG. 7 illustrates a very thin wire 700 extending diagonally from top to bottom over a plate 710 of low density material. An image of the plate 710 is sampled using the prior art technique and the arrangement of the present invention, as described above.

Here, the wire 700 has a density value of "10" and the underlying plate has a density value of "1". Each of the large pixels is sampled and pixels 720 contains none pixel 730 contains, a small fraction and pixel 740 contains the largest possible fraction of the wire. Because of the "partial volume" effect, the wire fills only 0.1 of the pixel 740 and the wire fills less than 0.05 of the pixel 730. Thus, pixel 730 is assigned the value "1", as previously discussed.

Figure 8:
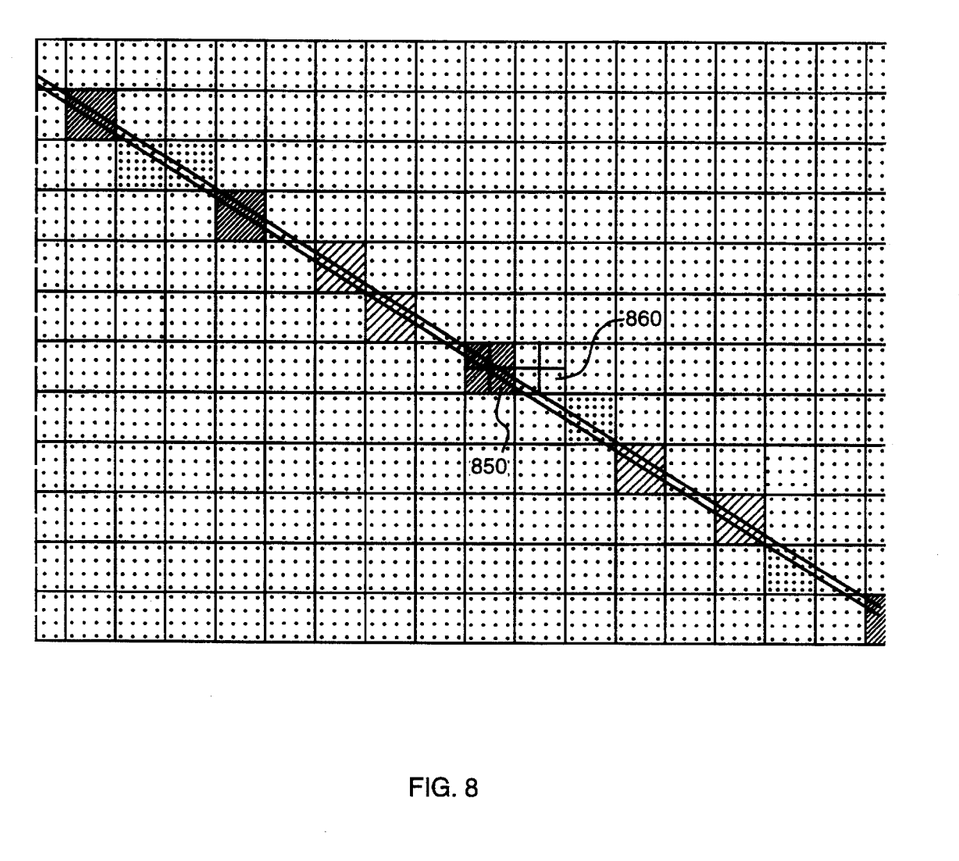
FIG. 8 shows a thin wire image that is sampled using the improved sampling arrangement of FIG. 6.

FIG. 8 shows an image of the thin wire sampled using the improved sampling arrangement of the invention. Here, small pixels 850 and 860 are sampled and it is clear that the wire 800 fills about 0.3 of pixel 850 and 0.0 of pixel 860. By applying the simple algorithm, the surrounding pixels (e.g., above, to the left and above diagonally to the left) are assigned the same value as the sampled pixels and the resulting image is as shown. A comparison of the images of FIGS. 7 and 8 clearly shows that thin wires are more clearly imaged by the invention.

Figure 9:
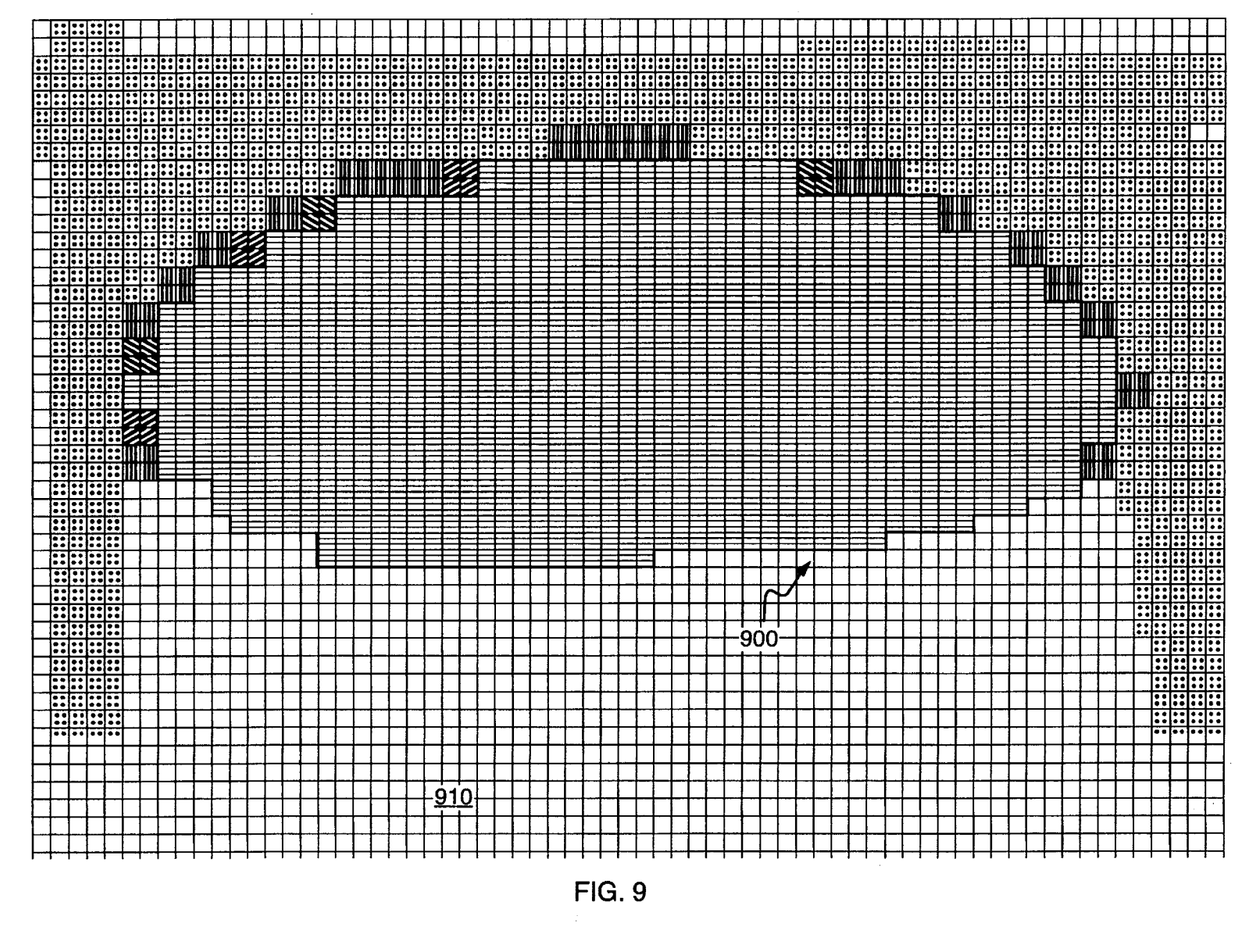
FIGS. 9 shows an image of a portion of an elliptical plate disposed over a lower density plate, the image having been sampled using the prior art sampling technique of FIG. 5.

FIG. 9 shows an ellipse 900 superimposed on a plate 910. The ellipse has a density value of "10", and the plate, a value of "1". Although every small pixel is shown in this figure, the resulting image is achieved by sampling every large pixel which, of course, comprises 4 small pixels.

Figure 10:
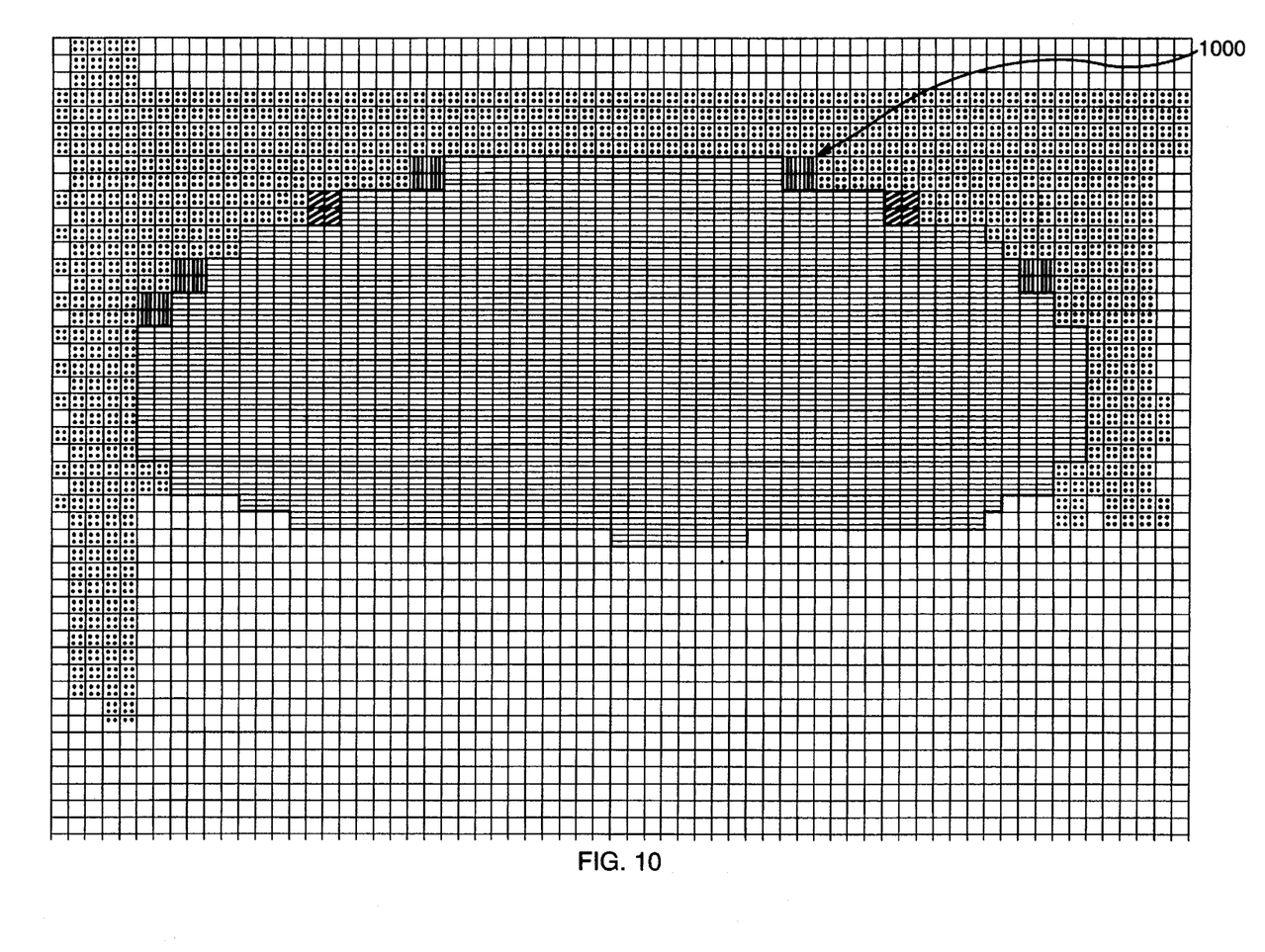
FIGS. 10 shows an elliptical plate image that is sampled in accordance with the improved digital sampling arrangement of the present invention.

FIG. 10 shows an elliptical image 1000 that is achieved when every fourth small pixel is sampled in accordance with the simple algorithm described herein. A comparison of the images in FIGS. 9 and 10 shows that (i) FIG. 10 has clearly sharper edges and is therefore more easily "understood" by a human brain and (ii) the ellipse 1000 of FIG. 10 appears darker than the ellipse 900 of FIG. 9. This phenomenon, which is commonly referred to as an "optical illusion", is a characteristic of the human brain and makes the ellipse 1000 of FIG. 10 more easily identifed.

In one aspect of the illustrative embodiment of the invention, the pulse system 200 described herein may be utilized to acquire data when sampling an object 280 using the improved sampling arrangement of sampling a subset of small pixels. A small cross-sectional pencil beam may also be used, assuming that the small beam has sufficient flux/photons to capture an image of the object. All of the image data acquired by the system is placed in those sampled pixels.

In general, the improved sampling arrangement generates better images when used with a pencil beam having many X-ray photons. When sampling a relatively thick object, most photons do not penetrate the object; however, use of a beam having a large number of photons per unit area will enable more photons to penetrate the target. On the other hand, when sampling a thin object, the large quantity of photons will highlight edges of the object, thus obviating a blurred image. Here, the image is limited in its spatial resolution as opposed to its contrast.

As noted, the area of a single pixel is preferably the same as the cross-section area of the pencil beam. Not only is this not a requirement, but such equality is actually unlikely since the pencil beam is determined by the dimensions of the helical slit 255 in the collimator 250 (FIG. 2). Accordingly, the pixel area may be chosen independently of the pencil beam cross-sectional area. More specifically, the invention described herein applies to arrangements in which the pencil beam cross-section area is equal to or greater than a "small"

pixel, but smaller than the area of a "large" pixel. (Note: the "large" pixel may be 4 or 9 times larger than the "small" pixel). Indeed, the size of the pencil beam may be equal to approximately three (3) small pixels, yet the sampling area is still a small pixel; thus, the pencil beam is much larger than the sampling area and all of the information that comes out of the detector is assigned to that small pixel area.

In another aspect of this invention, the improved sampling arrangement described herein may be used to send an image over a communication channel using only a fraction of the pixels that define the image. Here, a micro-densitometer may be used to digitize a typical X-ray image of, e.g., 14 inches by 17 inches. The digital representation of this image may consist of 2 million pixels. The improved sampling arrangement may be used to sample approximately one-fourth of these pixels or 500,000 pixels. The information contained in these latter pixels is transmitted over the communications channel at one-fourth the cost of transmission. The recipient of the information may reconstruct the image using either the simple or extrapolation algorithm described herein.

It should be noted that this invention should not be confused with known "edge enhancement" techniques, which improve the contrast of edges at the cost of changing the basic image data. These edge enhancement techniques typically blur an image; that is, the values of each set of 4 pixels are merely replaced by the average of the 4 pixels. By averaging the set of values, the resulting picture is a background image with all the edges eliminated. The actual image is then subtracted from the blurred image, resulting in only the edges being present. In contrast, the improved digital sampling arrangement of the present invention sharpens edges and improves the quality of an image without introducing any distortion of the image. Of course, the conventional edge enhancement techniques may be used to enhance the images generated in accordance with the teachings described herein.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for sampling an object comprising the steps of:
   apportioning the object into a plurality of pixel regions, each of said regions containing a pixel of fixed location relative to a plurality of surrounding pixels;
   sampling said fixed location pixel of said region;
   assigning a measured density value to said sampled pixel; and
   allocating density values for said surrounding, unsampled pixels, said allocated density values being dependent upon said assigned density value of said sampled pixel.

2. The method of claim 1 wherein the step of allocating comprises the step of designating density values for said unsampled pixels that are the same as said assigned density value.

3. The method of claim 1 wherein the step of allocating comprises the step of designating density values for said unsampled pixels by extrapolating between adjacent sampled pixels until all of said unsampled pixels are allocated density values.

4. An improved digital sampling arrangement comprising:
   means for apportioning an object into a plurality of pixel regions, each of said regions containing a pixel of fixed location relative to a plurality of surrounding pixels;
   means for sampling said fixed location pixel of said region;
   means for assigning a measured density value to said sampled pixel; and
   means for allocating density values for said surrounding, unsampled pixels, said allocated density values being dependent upon said assigned density value of said sampled pixel.

5. The improved arrangement of claim 4 wherein said allocating means comprises means for designating density values for said unsampled pixels that are the same as said assigned density value.

6. The improved arrangement of claim 4 wherein said allocating means comprises means for designating density values for said unsampled pixels by extrapolating between adjacent sampled pixels until all of said unsampled pixels are allocated density values.

7. An improved method for digitally sampling an object comprising the steps of:
   apportioning the object into a plurality of pixel regions, each of said regions containing a pixel of fixed location relative to a plurality of surrounding pixels;
   sampling said fixed location pixel of said region;
   assigning a measured density value to said sampled pixel; and
   allocating density values for said surrounding, unsampled pixels, said allocated density values being dependent upon said assigned density value of said sampled pixel.

8. The improved method of claim 7 wherein said allocating step comprises the step of designating density values for said unsampled pixels that are the same as said assigned density value.

9. The improved method of claim 7 wherein said allocating step comprises the step of designating density values for said unsampled pixels by extrapolating between adjacent sampled pixels until all of said unsampled pixels are allocated density values.

10. An improved X-ray inspection system for sampling an object comprising:
    a pulsed X-ray source for radiating a cone of X ray pulses that penetrate the object;
    a detector for intercepting said X-ray pulses penetrating the object and for transforming said X-ray pulses into image data, said detector comprising at least one scintillating screen optically coupled to a plurality of photoemissive detecting elements;
    an electronic circuit for controlling said detector;
    means for apportioning the object into a plurality of pixel regions such that when said X-ray pulses are intercepted by said detector, said electronic circuit controls outputs of said photoemissive detecting elements to sample a fixed pixel location of said region relative to remaining pixels of said region;
    means for assigning a density value to said sampled pixel; and
    means for allocating density values for said surrounding, unsampled pixels, said allocated density values being dependent upon said assigned density value of said sampled pixel.

11. The improved X-ray inspection system of claim 10 further comprising a rotating cylindrical collimator for converting said X-ray pulses into a pencil-beam of X-ray pulses.

12. The improved X-ray inspection system of claim 11 further comprising an enclosure for containing said source, said enclosure having an integrally-formed precollimator that limits said radiated cone to a fan-beam of X ray pulses.

13. The improved X-ray inspection system of claim 12 further comprising a fixed-slit collimator arranged between said rotating cylindrical collimator and the object, said fixed-slit collimator further limiting said pencil-beam of X-ray pulses prior to penetrating the object.

14. The improved X-ray inspection system of claim 13 wherein said source is a high-energy pulsed linear accelerator.

15. The improved X-ray inspection system of claim 14 wherein said detector comprises a plurality of scintillating screens arranged in a back-to-back configuration to increase the efficiency of said detector.

16. The improved X-ray inspection system of claim 15 wherein said photoemissive detecting elements comprise photomultiplier tubes.

* * * * *

UNITED STATES PATENT AND TRADEMARK OFFICE
CERTIFICATE OF CORRECTION

PATENT NO. : 5,528,656
DATED : June 18, 1996
INVENTOR(S) : Martin Annis

It is certified that error appears in the above-indentified patent and that said Letters Patent is hereby corrected as shown below:

Column 3, line 31, after Fig. insert --2--;

Column 3, line 31, insert a paragraph before FIG. 4; and

Column 6, line 22, delete "dearly" and insert --clearly--.

Signed and Sealed this

Seventeenth Day of September, 1996

Attest:

BRUCE LEHMAN

*Attesting Officer*   *Commissioner of Patents and Trademarks*